United States Patent Office 3,506,109
Patented Apr. 14, 1970

3,506,109
METHOD OF AND APPARATUS FOR THE PRELIMINARY STACKING OF CONVEYED ARTICLES
Rudolf Heinrich Braas, Bad Hamburg vor der Hohe, Germany, assignor to Braas & Co. G.m.b.H., Frankfurt am Main, Germany, a corporation of Germany
Filed Jan. 12, 1968, Ser. No. 697,430
Claims priority, application Germany, Jan. 12, 1967, 1,506,417
Int. Cl. B65g 57/00
U.S. Cl. 198—35       9 Claims

ABSTRACT OF THE DISCLOSURE

Methods of and apparatus for superimposing or doubling conveyed articles in an automatic operation comprising the following successive steps: (1) arresting the article in its advance by laterally grasping the same by means of clamp rails; (2) lifting the grasped article above the conveying plane by said clamp rails; (3) withdrawing the clamp rails laterally to allow the article to freely fall on the top of the continuousy advanced, immediately following article in exact registry therewith; and (4) lowering the clamp rails into a stand-by position.

BACKGROUND OF THE INVENTION

This invention pertains to the preliminary stacking of articles while being conveyed towards a station for final stacking and packaging. The articles may be advanced at unchanging speed prior and subsequent to said preliminary stacking operation.

To achieve a more efficient final stacking of individually conveyed articles, it has been known earlier to be advantageous to effect a preliminary stacking or superimposition of the articles as they are transported by a cable conveyor or the like towards the final stacking station. One purpose of this superimposition or, as it will be hereinafter called, doubling, has been to adjust the delivery of the articles to the rhythm of manual operation performing the final stacking of the incoming articles by depositing them onto lower lying stacking belts. This particularly applies in cases where individual articles are advanced by a continuous conveyor having a substantial capacity of delivery. Instead of a mere doubling of two articles multiple doublings of the conveyed articles may be desired, especially when the final stacking step is carried out semi-automatically or automatically.

It is known to carry out the aforenoted preliminary doubling of advancing articles by manual means.

Under the conditions of large scale production and inherrent increased conveying capacity, the requirements substantially exceed the capabilities of manual operations. A physical over-exertion of manual force occurs especially in cases where multiple doublings have to be carried out. Such over-exertion inevitably leads to the deterioration of the quality of the manual work performed. Thus, the individual articles are often placed on one another in a staggered relationship which is undesirable especially when the final stacking is carried out by semi- or fully-automatic means. Further, damages to material occur as, during the accelerated manual operation, the articles are carelessly dropped in an impact-like manner on one another, whereby the upper article comes into engagement with the lower article at an angle instead of contacting it simultaneously along its entire length.

SUMMARY OF THE INVENTION

A principal object of the invention is to provide a novel method of and apparatus for effecting the doubling of conveyed articles by automatic means with the exclusion of manual operation so as to overcome the disadvantages set forth hereinabove.

According to the invention there is provided a method and apparatus whereby every other article conveyed in single file is stopped in its advance, lifted out of the conveying plane and held in a stationary manner as long as the immediately following article arrives thereunder, then the first article is deposited onto the continuously conveyed, immediately following article in such a manner that no breakage will occur and that both articles will continue their advance in a non-staggered, superimposed condition. The grasping, lifting, holding and depositing of the article is carried out gently, securely and in a repetitive manner.

Briefly stated, the inventive method of automatically doubling two conveyed articles with optimal care comprises the steps of first grasping the article laterally, then lifting the engaged article above the conveying plane, thereafter releasing it and letting it fall freely onto a second continuously moving article. The duration between the clamping and lifting step on the one hand and the releasing step on the other hand may be adjusted to ensure an exact registry of the superimposed articles.

The apparatus for practicing the aforenoted method comprises pneumatic or hydraulic pressure-operated piston and cylinder assemblies and an interconnected conduit and valve system which on an appropriate electric signal causes clamping means, operated by said cylinders, to laterally grasp the conveyed article, then, after a delay, lift the same above the conveying plane. Upon a further electric signal the said clamping means are withdrawn laterally allowing the lifted article to fall freely onto an article passing below and subsequently lowered into a stand-by position. Further, means are provided in said conduit and valve system to adjustably delay the response to the electric signal for the grasping and lifting operation with respect to the response to the signal for the withdrawing and lowering operation obviating thereby the necessity of using two separate control circuits for these steps.

Further details, advantages and possibilities of application will become apparent from the ensuing specification of a preferred, although exemplary, embodiment taken in conjunction with the drawings.

DESCRIPTION OF THE PREFERRED EMBODIMENT

Figure 1:
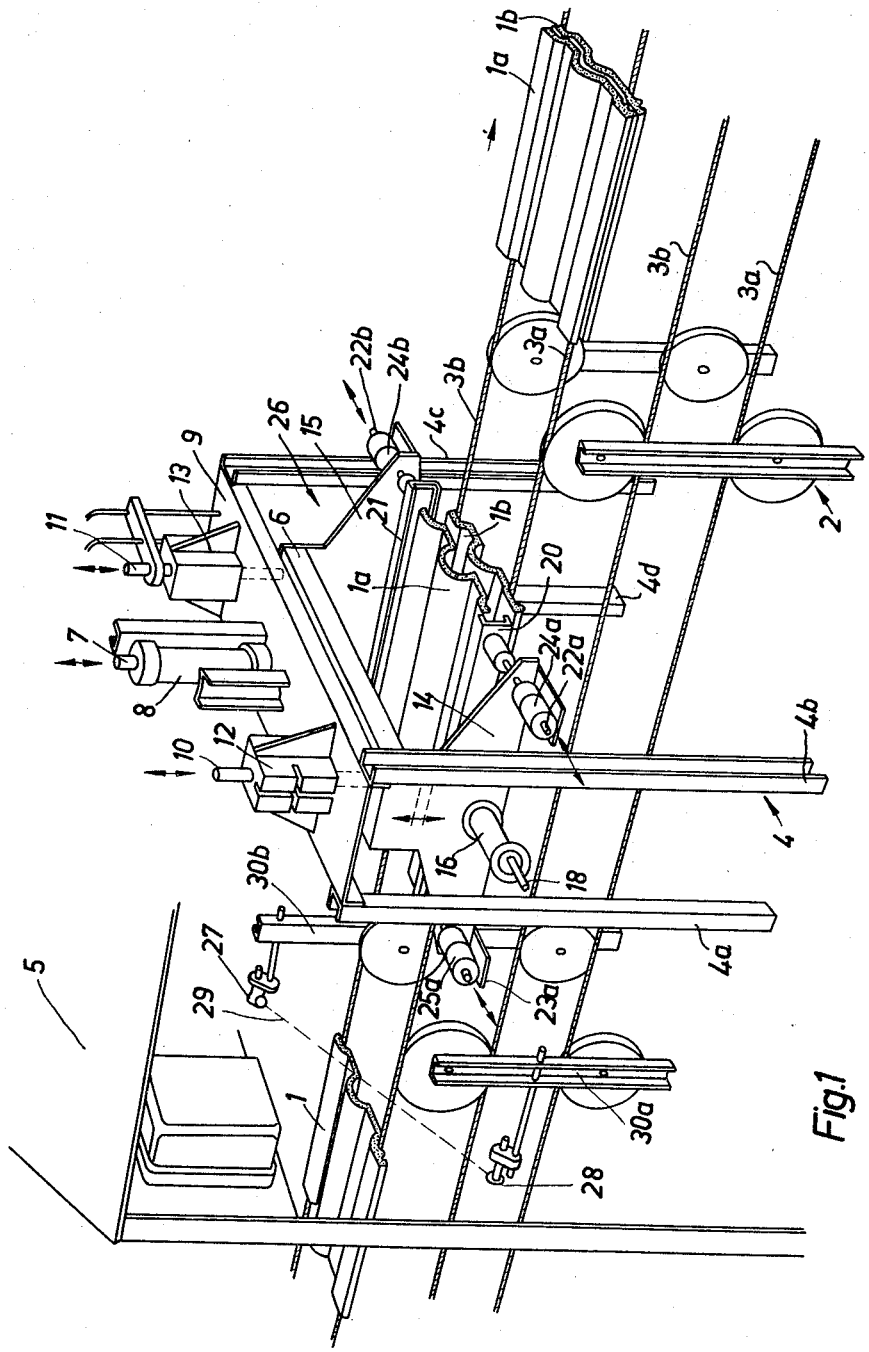
FIG. 1 is an isometric view of an embodiment of the apparatus according to the invention.
Figure 2:
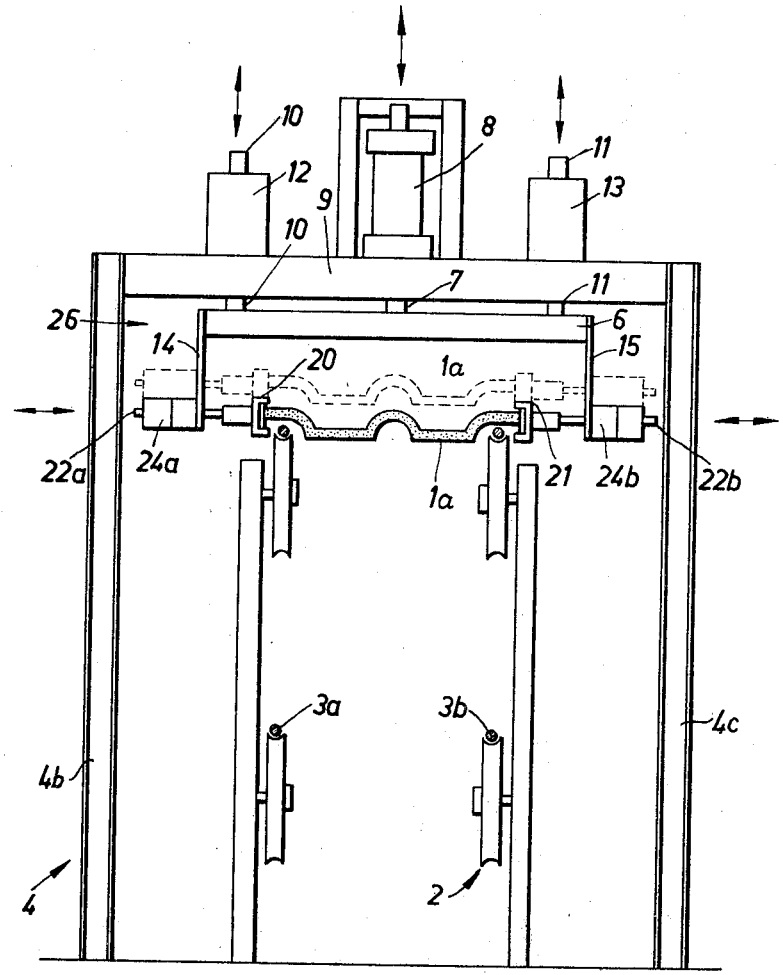
FIG. 2 is a front elevational view of the same apparatus showing some parts in dotted lines to indicate an alternate position.

The apparatus shown in FIGS. 1 and 2 is adapted to superimpose or double flat articles, such as concrete roof tiles 1 advanced in single file to a stacking station (not shown) by a conveyor generally indicated at 2 and formed, for example, by a pair of horizontally spaced conveyor cables 3a and 3b. The tiles are disposed on the upper flights of cables 3a and 3b lengthwise to the direction of travel and are supported by the cables at their marginal regions. It is to be understood that not only roof tiles but other articles may also be handled by the novel apparatus. Further, the particular cable conveyor shown in FIGS. 1 and 2 does not form part of the invention and, accordingly, other conveying means, such as plate conveyors, belt conveyors, or the like may be used to best suit the articles to be advanced.

Figure 3:
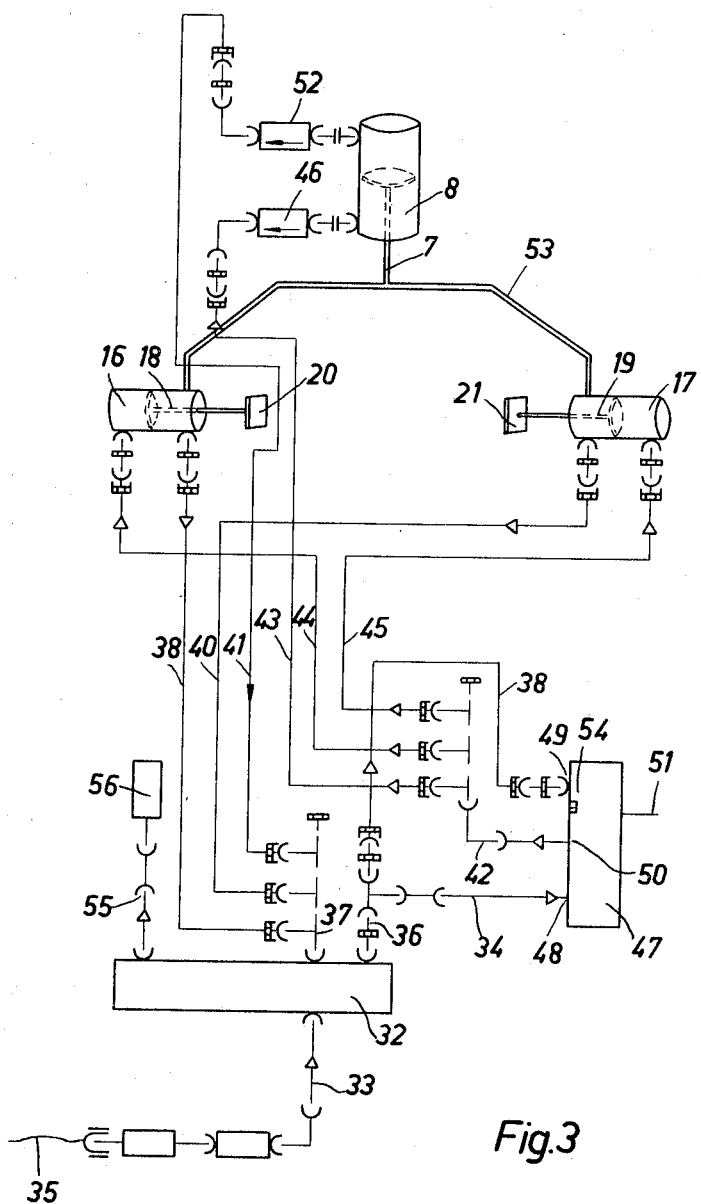
FIG. 3 is a schematic diagram of the pressure system according to the invention.

A supporting frame generally indicated at 4 is provided with a protecting roof or cover 5 partially shown in FIG. 1 and omitted altogether in FIG. 2. The uprights 4a, 4b, 4c and 4d of the supporting frame are connected at their top by a horizontal transversal support plate 9. To plate 9 there is centrally secured a pressure-operated lifting cylinder 8 including a vertically movable piston rod 7 which extends through plate 9 and carries therebelow a transversal horizontal beam 6. In order to ensure a precise up-and-down motion of transversal beam 6 there are provided at its lateral ends upwardly extending stems 10 and 11 protruding through appropriate apertures in plate 9 and guided in ball boxes 12 and 13 secured to plate 9. From opposed lateral ends of transversal beam 6 there extend downwardly vertical plate members 14 and 15 each carrying at its mid portion an outwardly directed, horizontally disposed, pressure-operated clamping cylinder 16, 17, respectively (FIG. 3). From cylinders 16 and 17 there extend respective piston rods 18 and 19 (FIG. 3) protruding inwardly through the vertical plate members 14 and 15. The ends of the piston rods 18 and 19 carry respective opposed clamp rails 20 and 21 to the ends of which there are rigidly affixed outwardly extending stems 22a, 22b and 23a, 23b that protrude through vertical plate members 14 and 15 and project into ball boxes 24a, 24b and 25a, 25b secured to members 14 and 15. The afore-described cylinders, pistons, rods, ball boxes, transversal members and clamp rails form part of the novel grasping and lifting device mounted on the supporting frame 4 and generally indicated at 26.

With the afore-described mechanical portion of the grasping and lifting device there is associated an electrical system not shown in its entirety. The system includes a light source 27 and a photocell 28 spaced therefrom. The light source 27 emits, towards the photocell 28, a light beam 29 adapted to be interrupted by the conveyed tiles 1. The light source 27 and the photocell 28 may be secured, respectively, to supports 30a and 30b serving as supports for the pulleys guiding the cables 3a and 3b of the cable conveyor. The largest part of the electric system is formed by a relay assembly associated with the photocell 28 and adapted to generate electric pulses. Since the relay assembly and its means of operation are known by those skilled in the art, they are not shown or described. It suffices to state that the circuit associated with the photocell is preferably designed in such a manner that electric signals actuating the pressure system now to be described are generated only at the moment the light beam 29 is interrupted.

Turning now to FIG. 3, there is schematically shown a pneumatic or hydraulic pressure system controlled by an electrical impulse generated each time the light beam 29 is interrupted by an advancing tile. The electrical relay system (not shown) is electrically connected to a four-way solenoid valve 32 of the pneumatic system in a known manner. The solenoid valve 32 is connected by means of a conduit 33 to a supply conduit 35 communicating with a source (not shown) delivering pneumatic or hydraulic pressure. From the solenoid valve 32 there extend two pressure conduits 36 and 37 and a discharge conduit 55 which is open to atmospheric pressure through a muffler 56. The pressure conduit 36 branches out into a main conduit 34 and a control conduit 38. From pressure conduit 37 there extend three parallel conduits 39, 40 and 41. The delay valve 47 known per se includes two main terminals 48 and 50, a control terminal 49 and a discharge terminal 51. The branch conduits 34 and 38 extending from the pressure conduit 36 are connected respectively to the main terminal 48 and to the control terminal 49. From the other main terminal 50 there extends a conduit 42 which branches off into conduits 43, 44 and 45. The conduit 43 is connected to the rod side of the lifting cylinder 8 through a speed control valve 46 which dampens the flow of the pressure medium only in the direction of the arrow and allows free passage thereof in the opposite direction. The valve 46 will be designated hereinafter as "lowering speed control valve." The conduits 44 and 45 merge into the piston side of the grasping or clamping cylinders 16 and 17. The conduit 41 is connected with the piston side of the lifting cylinder 8 through a speed control valve 52 which, similarly to the valve 46, throttles the flow speed of the pressure medium in the direction of the arrow and thereby delays the upward motion of the piston rod 7 with respect to the grasping motion of piston rods 18 and 19. The valve 52 will be designated hereinafter as "lifting speed control valve." Conduits 39 and 40 are respectively connected to the rod side of grasping cylinders 16 and 17. The clamp rails 20 and 21 are shown schematically in FIG. 3. The yoke 53 schematically designates the rigid assembly formed by horizontal beam 6 and vertical plate members 14, 15 shown in FIGS. 1 and 2. As indicated before, the said rigid assembly mechanically interconnects said clamping rails, cylinders and pistons to form the principal mechanism of the novel grasping and lifting device.

The unidentified symbols drawn into the pressure conduits represent known mechanisms associated with pressure conduits, such as quick release couplings, hose clamps, etc., and are, therefore, not decribed or shown in further detail.

OPERATION OF THE PREFERRED EMBODIMENT

In the absence of electric current, the solenoid valve 32 is in such a position that communication exists between conduits 33 and 37. As a consequence, conduits 39, 40, 41 are pressurized, causing piston rod 7 to move downwardly together with the assembly formed by beam 6 and vertical members 14, 15. Simultaneously, as pressure builds up in the rod side of cylinders 16 and 17, the respective piston rods 18 and 19 move away from each other; thus the grasping device will open. After completion of the aforenoted movements, the lifting and grasping device is in an open, stand-by position approximately at the level of the upper flights of the cables 3a and 3b.

As soon as a conveyed roof tile 1a passed between the light source 27 and the photocell 28, the light beam 29 is interrupted whereby the photocell generates, through a relay system, an electrical impulse which switches the solenoid valve 32. As a result, communication is interrupted between conduits 33 and 37, but established between conduits 33 and 36 and between conduits 37 and 55. Thus, the pressure medium is introduced into the delay valve 47 by conduits 34, 38 and from delay valve 47 into the piston side of cylinders 16 and 17 and into the rod side of cylinder 8 through conduits 42, 43, 44 and 45. Due to the retarding or dampening effect of the lifting speed control valve 52 on the medium displaced from the piston side of the cylinder 8 as pressure is introduced into the rod side thereof, the roof tile 1a is first laterally grasped (solid line position in FIG. 2) and, after a delay, lifted off the cable conveyor (dotted line position in FIG. 2). Thus, a protective and, above all, a repetitive engagement and subsequent uniform lifting of every other roof tile may be achieved.

As the immediately following roof tile 1b interrupts the light beam 29, the solenoid valve 32 is again switched and assumes its position it had before roof tile 1a interrupted light beam 29. Thus, again, conduit 33 is connected with conduit 37 and conduit 36 is connected with discharge conduit 55. As a result, the piston side of cylinder 8 and the rod side of cylinders 16, 17 are pressurized. Now, the lowering speed control valve 46 dampens the flow of the medium displaced from the rod side of the lifting cylinder 8. As a consequence, the grasping and lifting device, due to the fast withdrawal of clamp rails 20 and 21, first releases the roof tile 1a and allows it to drop by free fall onto tile 1b before the device is again lowered into its stand-by position. By this time the superpositioned roof tiles 1a and 1b are carried away by conveyor cables 3a, 3b and are no longer in the vertical reciprocating path of clamp rails 20, 21. The device is now ready for the next cycle of operation.

It has been found that are grasping and lifting step responds faster to the electric signal than the step of withdrawing the clamp rails. To properly coordinate these two steps and thus ensure an exact superpositioning of the two tiles, normally two control circuits should be used each associated individually with the two steps and coordinated according to the different characteristics of motion.

The use of delay valve 47 according to the invention obviates the necessity of using two control circuits; it permits the use of a single circuit at constant conveyor speeds. The delay valve 47 is effective when the supply conduit 33 is connected to the conduit 36 whereby the latter is connected to the main terminal 48 and to the control terminal 49 of the delay valve 47. The output terminal 50 of delay valve 47 is coupled to conduit 42 which delivers clamping pressure to the piston side of cylinders 16, 17 and lifting pressure to the rod side of cylinder 8. It follows that the response of the clamping and lifting steps to the corresponding signal are delayed with respect to the response of the releasing and lowering steps to the corresponding energizing signal. The duration of the delay in said response determines the accuracy of registry of the two superpositioned tiles and may be varied by adjusting screw 54. This delay and its adjustment are independent of the delay of the lifting step vis-a-vis the grasping step or of the delay of the lowering step vis-a-vis the releasing step. These two latter delays are effected, as set forth hereinbefore, by means of the speed control valves 46 and 42.

Although a single embodiment of the invention has been depicted and described, it will be apparent that this embodiment is illustrative in nature and that a number of modifications in the apparatus and variations in its end use may be effected without departing from the spirit or scope of the invention.

That which is claimed is:

1. Method of superimposing or doubling articles advanced in single file on conveyor means comprising the following automatic, successive and repetitive steps:
   (A) arresting every other article in its advance by laterally grasping the same,
   (B) lifting the grasped article out of the conveying plane to allow the immediately following article to continue its advance uninterruptedly on said conveyor means, and
   (C) releasing said grasped and lifted article to allow it to freely fall onto said immediately following article, the time period between said grasping step and said releasing step being adjustable to ensure an exact registry of the released article with said immediately following article.

2. Method as defined in claim 1, wherein said grasping and lifting steps are initiated by a first signal triggered by the advancing article to be grasped and lifted, said releasing step is initiated by a second signal triggered by said immediately following, continuously advanced article.

3. Method as defined in claim 2, wherein said time period between said grasping step and said releasing step is adjusted by variably delaying the response of said grasping and lifting steps to said first signal.

4. An apparatus for superimposing or doubling articles advanced in single file on conveyor means comprising
   (A) sensing means adapted to be triggered by said advanced articles;
   (B) a lifting device disposed transversally of said conveyor means and including
      (1) clamping means having
         (a) a pair of clamping members movable simultaneously transversally of said conveyor in a substantially horizontal direction towards and away from one another to laterally frictionally grasp and, respectively, release selected ones of said articles,
         (b) a first power cylinder means mechanically connected with said clamping members to cause said transversal, substantially horizontal movements thereof,
      (2) lifting means to vertically move said pair of clamping members as a unit into and between a lower or stand-by position in which said clamping members are adapted to laterally grasp a selected article advanced on said conveyor means and an upper position spaced from said lower position to an extent more than the maximum height dimension of said articles on said conveyor means, said lifting means including a second power cylinder means mechanically connected to said clamping members to cause said vertical movements thereof, and
   (C) a pressure system associated with said first and said second power cylinder means, said pressure system including distributor valve means adapted to assume a first stage causing said first power cylinder means to move said clamping members away from one another into a releasing position and causing said second power cylinder means to move said clamping members into said lower position, said distributor valve means adapted to assume a second stage causing said first power cylinder means to move said clamping members towards one another into an article grasping position and causing said second power cylinder means to move said clamping members into said upper position, said distributor valve means adapted to be set from one of said stages to the other upon energization by an electric signal initiated by said sensing means upon triggering by said advanced articles.

5. An apparatus as defined in claim 4, wherein said sensing means is a light sensitive assembly including a photocell and a light source emitting a light beam directed to said photocell and traversing the path of travel of said articles.

6. An apparatus as defined in claim 4, including lowering speed control valve means associated with said second power cylinder means effective to delay the movement of said clamping members into said lower position with respect to the movement thereof into said releasing position and lifting speed control valve means associated with said second power cylinder means effective to delay the movement of said clamping members into said upper position with respect to the movement thereof into said grasping position.

7. An apparatus as defined in claim 6, wherein each of said power cylinder means includes a piston side and a rod side, said distributor valve means when in said first stage admits pressurized medium to the rod side of said first power cylinder means and to the piston side of said second power cylinder means, said distributor valve means when in said second stage admits pressurized medium to the piston side of said first power cylinder means and to the rod side of said second power cylinder means, said lowering speed control valve is connected to the rod side of said second power cylinder means and said lifting speed control valve is connected to the piston side of said second power cylinder means.

8. An apparatus as defined in claim 4, wherein said pressure system includes an adjustable delay valve effective when said distributor valve means is set into its first stage to retard in a controlled manner the movements of said clamping members into said releasing position and into said lower position in response to said electric signal setting said distributor valve means into said first stage.

9. Apparatus as defined in claim 4, wherein said lifting means includes a substantially horizontal transversal support plate extending above the conveying plane of said conveyor means and normal to the direction of travel of said articles, said second power cylinder means is secured to said support plate; a piston rod extending downwardly from said second power cylinder means, a transverse beam movably disposed under said support plate and secured to the piston rod of said second power cylinder means, opposed vertical plate members fixedly secured at each end of said support plate, said first power cylinder means include two first power cylinders, one secured to each of said vertical plate members, a piston rod extending substantially horizontally from each of said first power cylinders; said clamping members include two clamp rails disposed on either side of said conveyor means and secured to said piston rods of said first power cylinders.

References Cited

UNITED STATES PATENTS

| | | | |
|---|---|---|---|
| 2,960,206 | 11/1960 | Dougherty | 198—35 |
| 3,055,514 | 9/1962 | Dale et al. | 214—6 |

ROBERT G. SHERIDAN, Primary Examiner